(12) United States Patent
Tu (10) Patent No.: US 11,396,422 B2
(45) Date of Patent: Jul. 26, 2022

(54) SILO DYNAMIC VIBRATION ATTENUATION SYSTEM AND METHOD

(71) Applicant: Phung Tu, Perth (AU)

(72) Inventor: Phung Tu, Perth (AU)

(*) Notice: Subject to any disclaimer, the term of this patent is extended or adjusted under 35 U.S.C. 154(b) by 379 days.

(21) Appl. No.: 16/608,820

(22) PCT Filed: Aug. 3, 2018

(86) PCT No.: PCT/AU2018/050811
§ 371 (c)(1),
(2) Date: Nov. 1, 2019

(87) PCT Pub. No.: WO2019/033153
PCT Pub. Date: Feb. 21, 2019

(65) Prior Publication Data
US 2020/0283226 A1 Sep. 10, 2020

(30) Foreign Application Priority Data
Aug. 14, 2017 (AU) .................. 2017903256

(51) Int. Cl.
*B65D 90/48* (2006.01)
*B65D 88/26* (2006.01)
*F16F 7/10* (2006.01)
*F16F 15/02* (2006.01)

(52) U.S. Cl.
CPC ............ *B65D 90/48* (2013.01); *B65D 88/26* (2013.01); *F16F 7/1005* (2013.01); *F16F 15/02* (2013.01); *B65D 2590/0083* (2013.01); *F16F 2230/08* (2013.01); *F16F 2230/18* (2013.01)

(58) Field of Classification Search
CPC .............................. B65D 90/48; B65D 88/26; B65D 2590/0083; F16F 7/10; F16F 7/104; F16F 7/1005; F16F 2230/08; F16F 2230/18; F16F 15/02; F16F 15/04
See application file for complete search history.

(56) References Cited

U.S. PATENT DOCUMENTS

2017/0130802 A1* 5/2017 Lee .................. F16F 7/1011

FOREIGN PATENT DOCUMENTS

| CN | 207518627 U | * | 6/2018 | |
| DE | 19606721 A1 | * | 8/1997 | ............. B65D 88/26 |
| WO | WO-9730915 A1 | * | 8/1997 | ............. B65D 88/26 |

* cited by examiner

*Primary Examiner* — Vishal R Sahni (57) ABSTRACT

Provided is a dynamic vibration attenuation system 10 for a granular material silo 8. The system 10 comprises a sensor arrangement 12, a processor 16, and a damping arrangement 24. The sensor arrangement 12 is configured for operatively sensing, over a period comprising a plurality of instances of time, a displacement of the silo 8, a weight of granular material in the silo 8, and a flow rate of granular material discharged from the silo 8. The processor 16 is arranged in signal communication with the sensor arrangement 12 and is configured to calculate, at each instance of time, a resultant dynamic force from the sensed displacement, weight and flow rate. System 10 further includes damping arrangement 24 which is operatively responsive to the processor 16 and is configured to dynamically dampen the resultant dynamic force in order to maintain vibration amplitudes in the silo structure 9 below a user-selectable threshold.

23 Claims, 3 Drawing Sheets

SILO DYNAMIC VIBRATION ATTENUATION SYSTEM AND METHOD

TECHNICAL FIELD

This invention relates to dynamically attenuating silo vibration, in general, and in particular to a dynamic vibration attenuation system, a dynamically attenuated silo, and an associated method for dynamically attenuating silo vibration.

BACKGROUND ART

The following discussion of the background art is intended to facilitate an understanding of the present invention only. The discussion is not an acknowledgement or admission that any of the material referred to is or was part of the common general knowledge as at the priority date of the application.

Silos are well known in the art. A silo is generally a structure for storing bulk materials, typically particulate material, and such silos are often used in agriculture to store grain, or bulk material applications such as bulk storage of coal, cement, carbon black, woodchips, food products, sawdust, or the like. A further application of silos is in the resources industry, where typically ore is stored in silos, such as for train loading systems, or the like.

The flow of bulk solids in silos can be accompanied by dynamic pulsations and self-excited vibrations. The frequency of these pulsations can be larger than 1 Hz, and sometimes vibrations in the audible range can occur. The latter is typically called silo noise, silo honking or silo music, where the noise often appears intermittently with a sound similar to that of a truck horn.

Distinct shocks appearing at irregular intervals of seconds to hours can also occur in silos, which are typically called silo quaking or silo thumps. Depending on the properties of the ground supporting the silo, shocks can spread out far into the surroundings. Silo quaking and silo honking can thus affect the environment, are unpleasant for personnel nearby and can damage a silo structure.

Silo vibrations are commonly caused or induced by material discharge and vary from an audible noise to a vigorous and unpleasant vibration of a floor on which the silo rests. These vibrations may be harmless, i.e. just a source of discomfort or nuisance, or they could lead to catastrophic failure of the silo or surrounding structures, as well as health problems for personnel exposed to strong noise and vibration.

Research has shown that the vibration amplitudes and frequencies of silo quake are not consistent across each discharge cycle. Each discharge cycle may produce a different accelerogram containing different vibration amplitudes and frequencies, thus making it extremely difficult for traditional dynamic structural analysis methods to accurately predict the response of a silo structure during discharge, which makes it very difficult to design a silo with suitable vibration dampers to reduce the amplitudes of vibrations accordingly.

The present invention was conceived with these shortcomings in mind.

SUMMARY OF THE INVENTION

According to a first aspect of the invention there is provided a material silo comprising:

a silo structure for operatively receiving and/or discharging particulate material;

a sensor arrangement configured for operatively sensing, over a period comprising a plurality of instances of time, due to material movement via the silo, a displacement of the silo structure, a weight of granular material in the silo, and a flow rate of granular material received and/or discharged from the silo;

a processor arranged in signal communication with the sensor arrangement, and configured to calculate, at each instance of time, a resultant dynamic force from the sensed displacement, weight and flow rate; and a damping arrangement operatively responsive to the processor and configured to dynamically dampen the resultant dynamic force in order to maintain vibration amplitudes in the silo structure below a user-selectable threshold.

Typically, the processor is configured to calculate the resultant dynamic force, at each instance of time (t), according to:

$$\Sigma f(t) = (m(t) - dm)\ddot{x}(t) + (2\delta(t)\sqrt{k(t)(m(t)-dm)})\dot{x}(t) + k(t)x(t)$$

Where, for the silo:
x(t) is the displacement at instance of time t;
$\dot{x}(t)$ is the velocity at instance of time t;
$\ddot{x}(t)$ is the acceleration at instance of time t;
m(t) is the time-variant mass at instance of time t;
dm is the change in the mass at instance of time t;
δ(t) is the critical damping ratio at instance of time t;
k(t) is the stiffness at instance of time t; and
Σf(t) is the resultant dynamic force at instance of time t.

It is to be appreciated by the skilled addressee that sensing of the displacement, vibration, mass and/or flow rate of the silo over the period facilitates calculation of a resultant displacement, velocity and/or acceleration of the silo at an instance of time. As such, the calculated resultant force may comprise elements of such mass, displacement, velocity and/or acceleration.

Typically, the sensor arrangement comprises sensors selected from a group consisting of accelerometers, vibrometers, displacement sensors, load cells, strain gauges, weight scales, microphones, flow meters and other sensors suitable to facilitate calculation of the above formula.

Typically, the sensor arrangement is configured to capture a vibration, a displacement, a weight of the granular material, and a flow rate at each instance of time and/or incremental change in the time-variant mass of the granular material during discharge.

Typically, the processor comprises any suitable central processing unit having electronic circuitry configured to perform arithmetic, logical, control and/or input/output (I/O) operations as specified by a set of instructions.

Typically, the processor includes a memory arrangement with a database for storing a suitable set of instructions, including user-definable silo characteristics.

In one example, the user-definable silo characteristics are selected from a group comprising the critical damping of the silo, the stiffness of the silo structure, a geometry of the silo, structural material properties of the silo, structural member properties comprising the silo, static and/or dynamic load forces of the silo structure, vibration damper properties and locations on the silo structure, silo support properties, and/or any data necessary to enable accurate dynamic analysis of the silo structure.

Typically, the damping arrangement comprises at least one damper selected from a group consisting of an active mass damper, an active stiffness damper, a semi-active mass damper, a semi-active stiffness damper, a passive mass damper, a passive stiffness damper, and structural strengthening means.

According to a second aspect of the invention there is provided a dynamic vibration attenuation system for a granular material silo operatively receiving and/or discharging particulate material, said system comprising:

a sensor arrangement configured for operatively sensing, over a period comprising a plurality of instances of time, due to material movement via the silo, a displacement of the silo structure, a weight of granular material in the silo, and a flow rate of granular material received and/or discharged from the silo;

a processor arranged in signal communication with the sensor arrangement, and configured to calculate, at each instance of time, a resultant dynamic force from the sensed displacement, weight and flow rate; and a damping arrangement operatively responsive to the processor and configured to dynamically dampen the resultant dynamic force in order to maintain vibration amplitudes in the silo below a user-selectable threshold.

Typically, the processor is configured to calculate the resultant dynamic force, at each instance of time (t), according to:

$$\Sigma f(t)=(m(t)-dm)\ddot{x}(t)+(2\delta(t)\sqrt{k(t)(m(t)-dm)})\dot{x}(t)+k(t)x(t)$$

Where, for the silo:
 $x(t)$ is the displacement at instance of time t;
 $\dot{x}(t)$ is the velocity at instance of time t;
 $\ddot{x}(t)$ is the acceleration at instance of time t;
 $m(t)$ is the time-varying mass at instance of time t;
 dm is the change in the mass at instance of time t;
 $\delta(t)$ is the critical damping ratio at instance of time t;
 $k(t)$ is the stiffness at instance of time t; and
 $\Sigma f(t)$ is the resultant dynamic force at instance of time t.

Typically, the processor is configured to calculate a dynamic response of the silo, at each instance of time (t), with the calculated dynamic force and mass of granular material remaining inside the silo obtained in accordance with the above formula.

Typically, the sensor arrangement comprises sensors selected from a group consisting of accelerometers, vibrometers, displacement sensors, load cells, strain gauges, weight scales, microphones, flow meters and other sensors suitable to facilitate calculation of the above formula.

Typically, the sensor arrangement is configured to capture a displacement, a vibration, a weight of the granular material, and a flow rate at each instance of time and/or incremental change in mass of the granular material during discharge.

Typically, the processor comprises any suitable central processing unit having electronic circuitry configured to perform arithmetic, logical, control and/or input/output (I/O) operations as specified by a set of instructions.

Typically, the processor includes a memory arrangement with a database for storing a suitable set of instructions, including user-definable silo characteristics.

In one example, the user-definable silo characteristics are selected from a group comprising the critical damping of the silo, the stiffness of the silo structure, a geometry of the silo, structural material properties of the silo, structural member properties comprising the silo, static and/or dynamic load forces of the silo structure, vibration damper properties and locations on the silo structure, silo support properties, and/or any data necessary to enable accurate dynamic analysis of the silo structure.

Typically, the damping arrangement comprises at least one damper selected from a group consisting of an active mass damper, an active stiffness damper, a semi-active mass damper, a semi-active stiffness damper, a passive mass damper, a passive stiffness damper, and structural strengthening means.

According to a third aspect of the invention there is provided a method for dynamically attenuating silo vibration, said method comprising the steps of:

sensing, over a period comprising a plurality of instances of time, a displacement of the silo, a weight of granular material in the silo, and a flow rate of granular material discharged from the silo;

calculating, at each instance of time, a resultant dynamic force from the sensed displacement, weight and flow rate; and dynamically damping the resultant dynamic force in order to maintain vibration amplitudes in the silo below a user-selectable threshold.

Typically, the step of calculating is performed by a processor configured to calculate the resultant dynamic force, at each instance of time (t), according to:

$$\Sigma f(t)=(m(t)-dm)\ddot{x}(t)+(2\delta(t)\sqrt{k(t)(m(t)-dm)})\dot{x}(t)+k(t)x(t)$$

Where, for the silo:
 $x(t)$ is the displacement at instance of time t;
 $\dot{x}(t)$ is the velocity at instance of time t;
 $\ddot{x}(t)$ is the acceleration at instance of time t;
 $m(t)$ is the mass at instance of time t;
 dm is the change in the mass at instance of time t;
 $\delta(t)$ is the critical damping ratio at instance of time t;
 $k(t)$ is the stiffness at instance of time t; and
 $\Sigma f(t)$ is the resultant dynamic force at instance of time t.

Typically, the step of sensing is performed by a sensor arrangement comprising sensors selected from a group consisting of accelerometers, displacement sensors, vibrometers, load cells and flow meters and other sensors suitable to facilitate calculation of the above formula.

In one example, the step of calculating comprises calculating, at each instance of time, a dynamic response of the silo structure, at each instance of time (t), with the calculated dynamic force and mass of granular material remaining inside the silo obtained from the above formula.

Typically, the step of damping is performed by a damping arrangement comprising at least one damper selected from a group consisting of an active mass damper, an active stiffness damper, a semi-active mass damper, a semi-active stiffness damper, a passive mass damper, a passive stiffness damper, and structural strengthening means.

According to a fourth aspect of the invention there is provided a computer programme product which, when executed by a suitable processor, facilitates performance of the method according to the third aspect of the invention, by a suitable computer system.

According to a fifth aspect of the invention there is provided a computer programme product which, when executed by a suitable processor, facilitates performance of a method of modelling silo vibration, said method comprising the steps of:

simulating, over a period comprising a plurality of instances of time, due to material flow through a silo, a displacement of the silo, a weight of granular material in the silo, and a flow rate of granular material discharged from the silo;

calculating, at each instance of time, a resultant dynamic force from the simulated displacement, weight and flow rate; and calculating resultant dynamic damping forces required for dynamically maintaining vibration amplitudes in the silo below a user-selectable threshold.

Typically, the steps of calculating are performed by the processor configured to calculate the resultant dynamic force, at each instance of time (t), according to:

$$\Sigma f(t) = (m(t)-dm)\ddot{x}(t) + (2\delta(t)\sqrt{k(t)(m(t)-dm)})\dot{x}(t) + k(t)x(t)$$

Where, for the silo:
x(t) is the displacement at instance of time t;
$\dot{x}$(t) is the velocity at instance of time t;
$\ddot{x}$(t) is the acceleration at instance of time t;
m(t) is the mass at instance of time t;
dm is the change in the mass at instance of time t;
δ(t) is the critical damping ratio at instance of time t;
k(t) is the stiffness at instance of time t; and
Σf(t) is the resultant dynamic force at instance of time t.

BRIEF DESCRIPTION OF THE DRAWINGS

The description will be made with reference to the accompanying drawings in which.

DETAILED DESCRIPTION OF EMBODIMENTS

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

As a general discussion of conventional practices for structural analyses, such existing static and dynamic structural analyses are often used in the design of structures such as ships, automobiles, aircraft, buildings, bridges and dams that are subjected to time-varying forces coming from earthquakes, wind, machineries, etc.

Static structural analyses are used to determine a structure's deformations, internal forces, stresses, support reactions and stability due to imposed static loads. Dynamic structural analyses are used to compute a structure's deformations, internal forces, stresses, support reactions, accelerations, velocities and stability due to imposed time varying forces, e.g. earthquakes, wind, etc. Together, these static and dynamic structural analyses form an integral part of the engineering design of structures.

Currently, dynamic structural analyses are only performed on fixed-mass structures subjected to time varying forces. Furthermore, advances in computer technology have allowed dynamic analyses to be performed with ease with the aid of structural analysis software. As such, the dynamic structural analyses typically involve the use of an abstract or mathematical model for the representation of the structural system and time varying forces, namely:

$$m\ddot{x} + c\dot{x} + kx = f_e$$

Where:
$\ddot{x}$ is the acceleration of the structure;
$\dot{x}$ is the velocity of the structure;
x is the deflection of the structure;
m is mass of the structure;
c is the damping of the structure;
k is the stiffness of the structure; and
fe is the time-varying external forces applied to the structure.

According to conventional analytical idealisation, ordinary and partial differential equations are often used. For example, the dynamic response of a very tall and slender building subjected to time varying loads, such as earthquake and wind loads, can be described by the second order differential equation or second order partial differential equation in three spatial dimensions, as per the formula above, over a period comprising a plurality of instances of time or solutions steps.

However, these existing dynamic structural methods make assumptions that the analysis only considers the impact of time-varying forces on the structure of a given mass (m), damping (c), and stiffness (k); that the mass (m) remains constant for all the solution time steps; that the dynamic forces (fe) are externally applied to the structure and vary for all the solution time steps; that the damping (c) remains constant for the solution time steps; and that the stiffness (k) remains constant for each of the instances of time or solution time steps.

However, these assumptions are not applicable to silo structures for a number of reasons, namely that the total mass (m) of the silo structure consists of stationary mass such as weight of the structure and temporary mass due to the granular material stored therein; the total mass (m) of the silo structure increases during filling and decreases during discharge processes; the change in mass (m) due to the incoming and exiting material in the silo structure causes the loads applicable to static and dynamic analyses and design of the structure to change accordingly; and the change in loads applicable to static structural analyses affect the overall static and/or dynamic equilibrium of the silo structure and also affect the initial conditions used for dynamic analyses.

Similarly, the conventional assumptions can lead to incorrect results due to the filling process generating dynamic forces ($f_e$) due to the particle impacting on the structure and other particles; the discharge process also generates dynamic forces ($f_e$) due to the particle to particle and particle to silo structure interactions; the total dynamic forces acting on the silo structure include both external and self-generated forces; the stiffness (k) of the structure changes according to the resultant force on the structure; and the damping (c) provided by the stiffness of the structure and the mass of the structure also change resulting in a total change of the damping value.

As a result, the time-varying mass effects of the silo structure described above cause the silo structure to vibrate excessively during discharge, an occurrence commonly known as silo quaking. Applicant has developed a novel and inventive solution to these shortcomings in the art.

Figure 1:
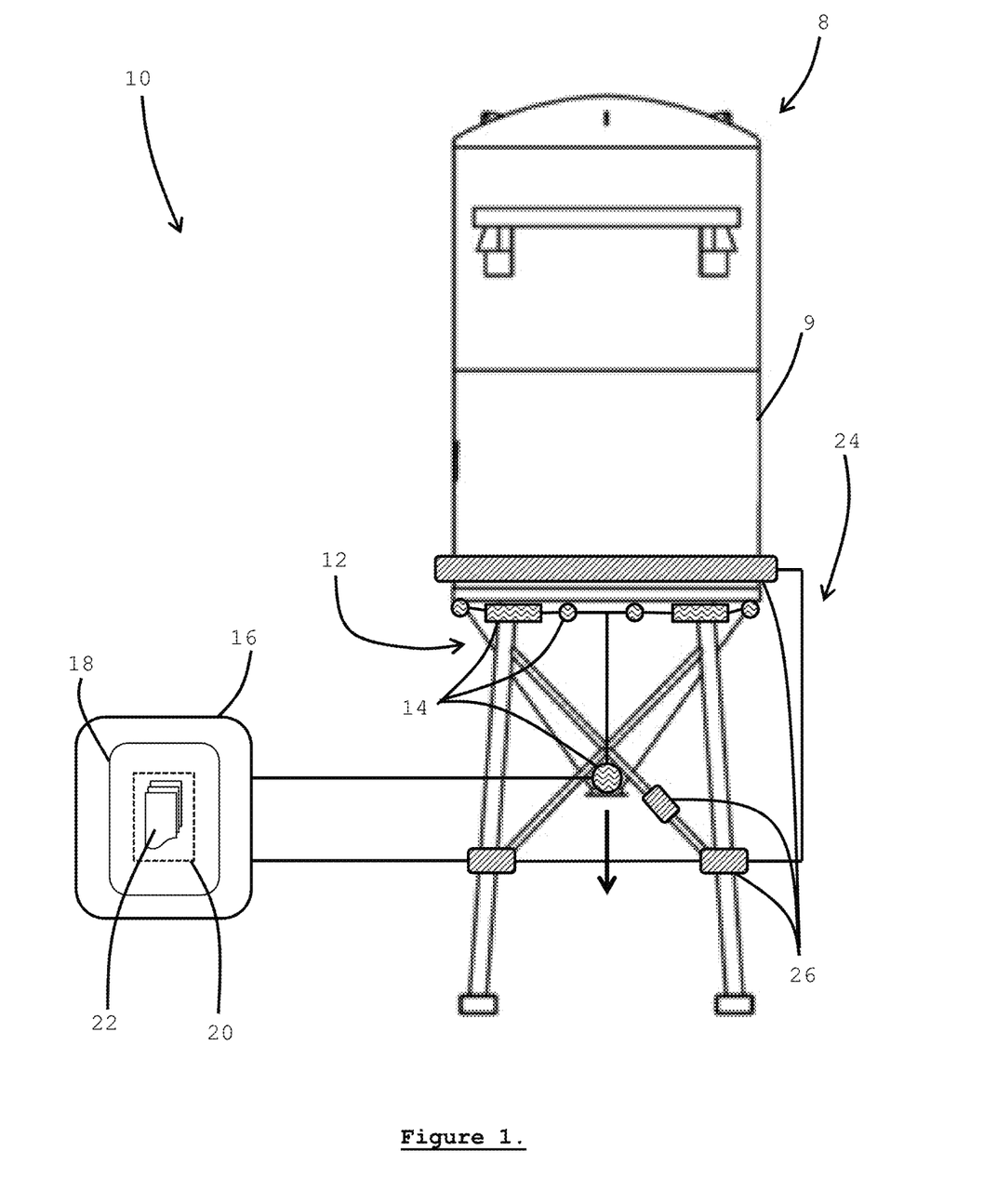
FIG. 1 is a diagrammatic representation of a dynamic vibration attenuation system for a granular material silo, in accordance with an aspect of the invention.

With reference now to FIG. 1 of the accompanying drawings, there is shown an example of a dynamic vibration attenuation system 10 for a granular material silo 8. The system 10 generally comprises a sensor arrangement 12, a processor 16, and a damping arrangement 24.

The sensor arrangement 12 is generally configured for operatively sensing, over a period comprising a plurality of instances of time, a displacement of the silo 8, a weight of granular material in the silo 8, and a flow rate of granular material discharged from the silo 8, as indicated by the downward arrow in FIG. 1. The skilled addressee will appreciate that sensing of the displacement, mass and/or flow rate of the silo over the period facilitates calculation of a resultant velocity and/or acceleration of the silo at any instance of time. As such, the calculated resultant force may comprise elements of such mass, displacement, velocity and/or acceleration. For example, vibrations of the silo 8 may be sensed, as displacement(s) over a period of time, or the like.

The processor 16 is arranged in signal communication with the sensor arrangement 12 and is configured to calculate, at each instance of time, a resultant dynamic force from the sensed displacement, weight and flow rate. The damping arrangement 24 is operatively responsive to the processor 16 and is configured to dynamically dampen the resultant dynamic force in order to maintain vibration amplitudes in the silo structure 9 below a user-selectable threshold.

In a preferred embodiment, the processor 16 is configured to calculate the resultant dynamic force, at each instance of time (t), according to the following formula:

$$\Sigma f(t) = (m(t) - dm)\ddot{x}(t) + (2\delta(t)\sqrt{k(t)(m(t) - dm)})\dot{x}(t) + k(t)x(t)$$

Where, for the silo 8:
x(t) is the displacement at instance of time t;
$\dot{x}(t)$ is the velocity at instance of time t;
$\ddot{x}(t)$ is the acceleration at instance of time t;
m(t) is the time-variant mass at instance of time t;
dm is the change in the mass at instance of time t;
δ(t) is the critical damping ratio at instance of time t;
k(t) is the stiffness at instance of time t; and
Σf(t) is the resultant dynamic force at instance of time t.

The sensor arrangement 12 generally comprises any suitable sensors, including accelerometers, vibrometers, displacement sensors, acoustic sensors, load cells, strain gauges, weight scales, microphones and flow meters. The displacement sensors may include level sensors or scanners, such as radar or LiDAR sensors, laser scanners, etc. The sensor arrangement 12 is configured to capture a vibration, a weight of the granular material, and a flow rate at each instance of time and/or incremental change in mass of the granular material during discharge from the silo.

In general, the processor 16 comprises any suitable central processing unit having electronic circuitry configured to perform arithmetic, logical, control and/or input/output (I/O) operations as specified by a set of instructions 22, such as a programmable logic controller, a computer system or the like. Typically, the processor 16 includes a memory arrangement 18 with a database 30 for storing a suitable set of instructions 22, including user-definable silo characteristics.

The skilled addressee will appreciate that the processor 16 may take a variety of forms. For example, the processor 16 may comprise an industrial controller. In another example, the processor 16 may comprise a supervisory control and data acquisition system (SCADA), able to be monitored and controlled wirelessly, over an intranet, over the Internet, or the like.

Importantly, irrespective of practical realisation of the processor 16, the user-definable silo characteristics typically comprise the critical damping of the silo, the stiffness of the silo structure, a geometry of the silo, structural material properties of the silo, structural member properties comprising the silo, static and/or dynamic load forces of the silo structure, vibration damper properties and locations on the silo structure, silo support properties, and/or any data necessary to enable accurate dynamic analysis of the silo structure. In such a manner, the variables necessary for the calculation of the resultant dynamic forces can be input into the processor 16.

It is further to be appreciated that the system 10 is generally configured to allow for a user to manually input values for dynamic force, acceleration, velocity, displacement, weight of granular material in the silo and flow rate for each instance of time (t) should any sensors not be available or, importantly, when the silo is in a design phase. This enables a design engineer to manually input the required data to predict the response, strengthen the structure, design and configure the dampers, etc. Similarly, an engineer can calibrate the system 10 at a commissioning phase.

The damping arrangement 24 generally comprises at least one damper 26 including an active mass damper, an active stiffness damper, a semi-active mass damper, a semi-active stiffness damper, a passive mass damper, a passive stiffness damper. In effect, the damping arrangement 24 may comprise any device or means whereby the mass m(t) or change in mass dm, critical damping δ, and/or stiffness k(t) is alterable, thereby altering the resultant dynamic forces, or the like. For example, electro-hydraulic and electro-pneumatic dampers may comprise active mass dampers, as well as selectively moveable weight(s), springs with adjustable spring coefficients, etc. may be used, depending on requirements.

As will be appreciated from the above example, the processor 16 is generally configured to calculate a resultant acceleration, velocity and displacement to dynamically dampen the amplitudes of vibration. As such, processor 16 can generally calculate a dynamic force from sensed inputs and/or calculate a resultant acceleration, velocity and displacement where the dynamic forces and structural properties are known so it can program the damping arrangement 24 to work accordingly. The processor 16 is configured to calculate the dynamic response of the silo structure, at each instance of time (t), with the calculated dynamic force and mass of granular material remaining inside the silo, as per the above formula.

As such, it is to be appreciated that the processor 16 generally first calculates the dynamic force from the sensed elements, and once the resultant forces are calculated, said processor uses the dynamic forces and masses to calculate the acceleration, velocity and displacement with modified damping values. Once the damping values are calculated, it uses those values to operate the dampers and/or notify an operator if structural strengthening of the silo is required.

Figure 2:
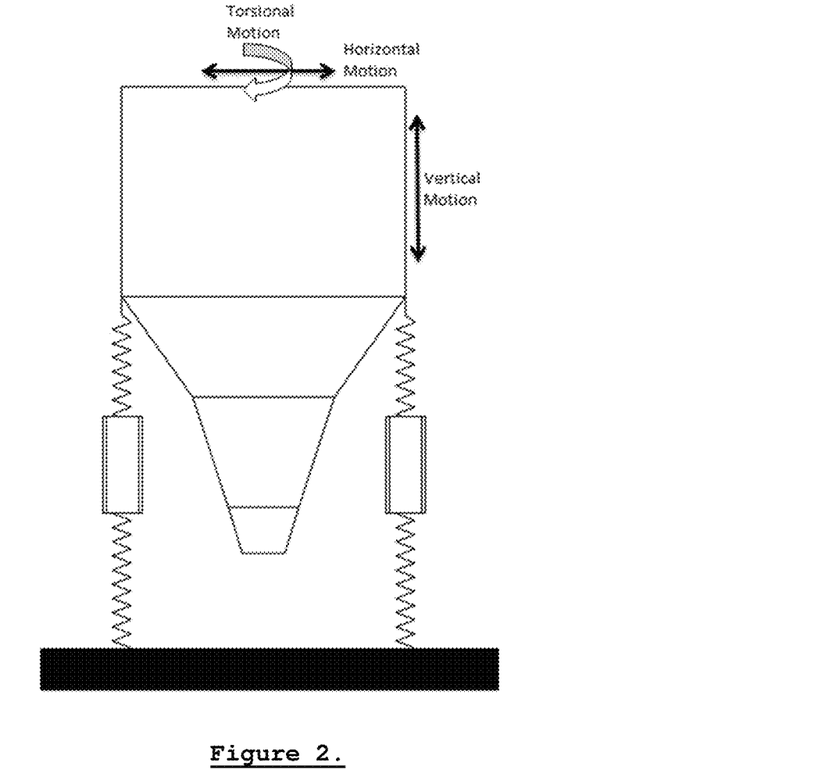
FIG. 2 is a diagrammatic representation of a model granular material silo for exemplifying an aspect of the invention.
Figure 3:
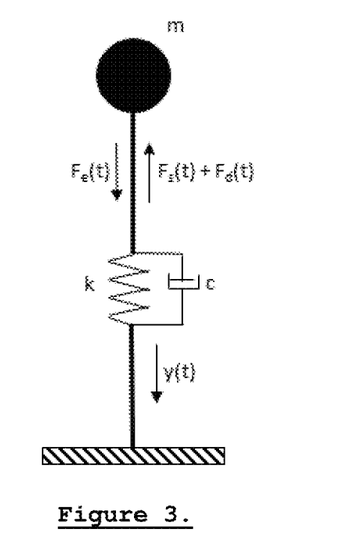
FIG. 3 is a diagrammatic representation of single degree of freedom mass spring model for a dynamically vibration attenuated silo.
Figure 4A:
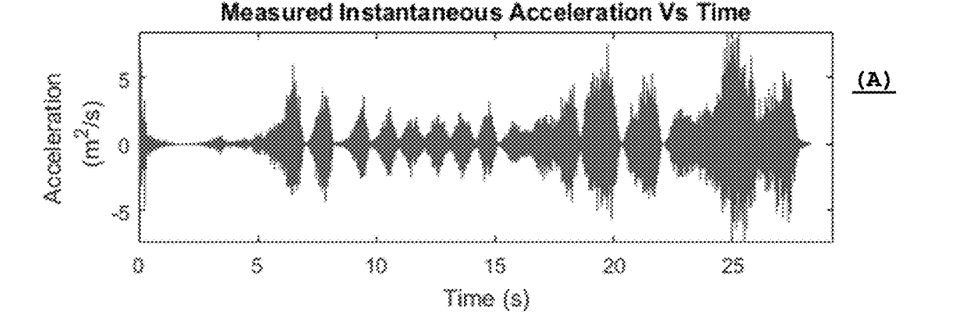
FIGS. 4(A)-(D) show vibration analyses diagrams of the mass spring model of FIG. 3 with different vibration results using different masses for the silo structure.
Figure 4B:
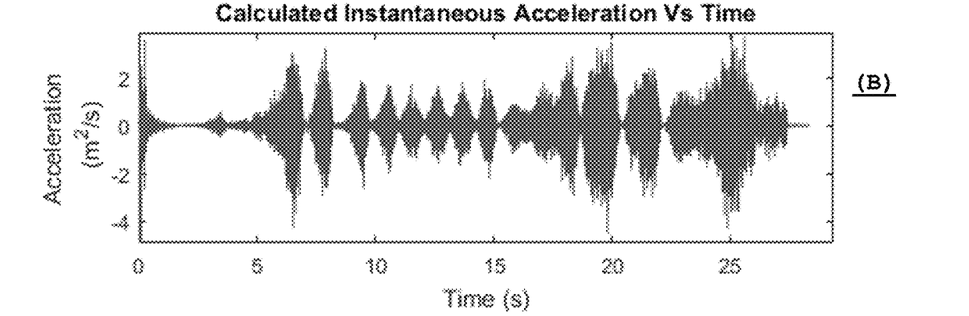
Figure 4C:
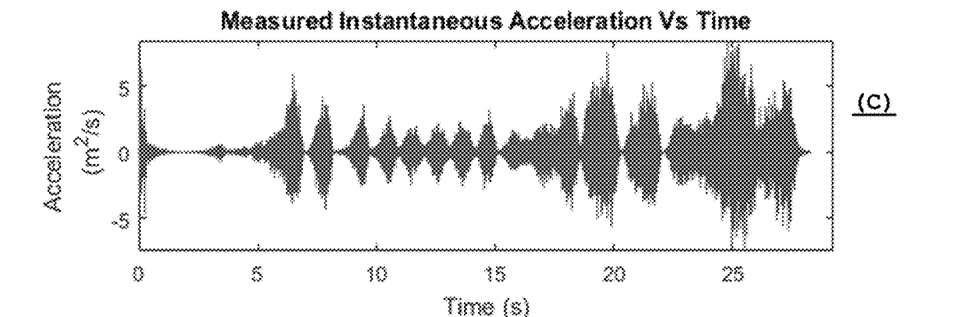
Figure 4D:
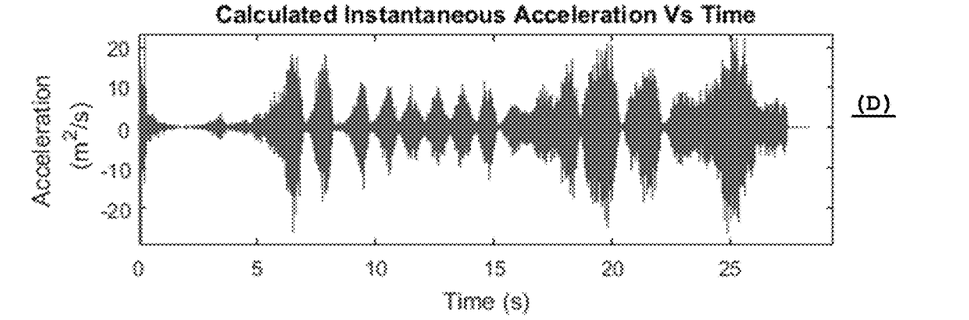

In light of the above, as an example referring to the silo shown in FIG. 2, which may have thousands of degrees of freedom, but for simplicity and for the purposes of illustration is represented by the single degree of freedom mass spring model shown in FIG. 3. In such an example, if the self-weight of the silo is 547.5 kilograms, and the stiffness of the supporting structure is 4545000 N/m, with the mass of granular material at 2746 kilograms, and a total time period taken to completely discharge the granular material from the silo being 28.268 seconds. If it is assumed that each instance of time or solution step is 1/2048 of a second, there are 57893 instances of time or solution steps. Using conventional granular flow modelling practices, the vibration forces vary throughout the duration of the discharge, resulting in approximately 57893 different values of dynamic force, one for each instance of time over the period.

Traditional dynamic structural analysis methods only allow for a single value of mass to be analysed against such multiple values of dynamic force. To illustrate the shortcoming in conventional dynamic structural analysis methods, two analyses are carried out, namely Analysis 1 shown in FIGS. 4 (A) and (B), with a total mass of the granular material of 2746 kilograms, and Analysis 2 shown in FIGS. 4 (C) and (D), with a total mass of the granular material of 5.62 kilogram. For comparison purposes, the same set of forces were input into both analyses and the responses of the structure are compared to the values obtained from accelerometers.

FIGS. 4 (A) and (B) show the analysis results using a single mass value of 2746 kilograms as the mass of the granular material inside the silo and multiple values of dynamic force and the accelerations measured by the accelerometer. FIGS. 4 (C) and (D) show the analysis results using a single mass value of 5.62 kilograms to represent the mass of the granular material inside the silo and multiple values of dynamic force and the accelerations measured by the accelerometer. Acceptable vibration is less than 2 m/s2 metre per second squared.

As illustrated in FIGS. 4 (A) and (B), Analysis 1 predicts the dynamic response of the silo structure which will lead to structural fatigue failure and health hazards for personnel exposed to strong vibrations. However, as illustrated in FIGS. 4 (C) and (D), Analysis 2 predicts the dynamic response of the silo structure which will require the silo structure to be strengthened by the design engineer to reduce the vibration to acceptable limits, which often requires expensive over-engineering to construct. The system 10 of the present invention is able to dynamically calculate and in real-time compensate for such damaging vibrations, as discussed above.

Applicant regards it as particularly advantageous that the present invention provides for an integrated vibration control system to prevent silo quaking. The system 10 is able to accurately predict, monitor and systematically reduce the deformations, internal forces, stresses, support reactions, accelerations and velocities of the silo structure during discharge. The system 10 is able to reduce the amplitude of vibration to acceptable limits by altering the structural design of the silo structure, monitor the vibration levels, alter the damping provided by the variable mass and stiffness dampers to maintain acceptable vibration limits, as well as being configurable to alert a user of the system 10 should the system be unable to maintain the vibration within acceptable limits.

The skilled addressee will appreciate that the invention also includes a dynamically vibration attenuated silo 8 which comprises the silo structure 9, the sensor arrangement 12 configured for operatively sensing, over a period comprising a plurality of instances of time, a displacement of the silo structure 9, a weight of granular material in the silo, and a flow rate of granular material discharged from the silo, and the processor 16 arranged in signal communication with the sensor arrangement 12, and configured to calculate, at each instance of time, a resultant dynamic force from the sensed displacement, weight and flow rate, as well as the damping arrangement 24 operatively responsive to the processor 16, and configured to dynamically dampen the resultant dynamic force in order to maintain vibration amplitudes in the silo structure 9 below a user-selectable threshold.

Similarly, the invention further includes an associated method for dynamically attenuating silo vibration, typically comprising the steps of sensing, over a period comprising a plurality of instances of time, a displacement of the silo, a weight of granular material in the silo, and a flow rate of granular material discharged from the silo; calculating, at each instance of time, a resultant dynamic force from the sensed displacement, weight and flow rate; and dynamically damping the resultant dynamic force in order to maintain vibration amplitudes in the silo below a user-selectable threshold.

In addition, the invention also comprises an associated computer programme product which, when executed by a suitable processor, facilitates performance of the method above, by a suitable computer system.

In particular, the present invention further provides for a computer programme product which, when executed by a suitable processor, facilitates performance of a method of modelling silo vibration. The method generally comprises the steps of simulating, over a period comprising a plurality of instances of time, due to simulated material flow through a silo, a displacement of the silo, a weight of granular material in the silo, and a flow rate of granular material discharged from the silo; calculating, at each instance of time, a resultant dynamic force from the simulated displacement, weight and flow rate; and calculating resultant dynamic damping forces required for dynamically maintaining vibration amplitudes in the silo below a user-selectable threshold.

Typically, the steps of calculating are performed by the processor configured to calculate the resultant dynamic force, at each instance of time (t), according to:

$$\Sigma f(t) = (m(t) - dm)\ddot{x}(t) + (2\delta(t)\sqrt{k(t)(m(t) - dm)})\dot{x}(t) + k(t)x(t)$$

Where, for the silo:
  x(t) is the displacement at instance of time t;
  $\dot{x}$(t) is the velocity at instance of time t;
  $\ddot{x}$(t) is the acceleration at instance of time t;
  m(t) is the mass at instance of time t;
  dm is the change in the mass at instance of time t;
  δ(t) is the critical damping ratio at instance of time t;
  k(t) is the stiffness at instance of time t; and
  Σf(t) is the resultant dynamic force at instance of time t.

The skilled addressee will further appreciate that the invention specifically includes an associated method for simulating dynamic attenuation of silo vibration, as is typical for silo structure design. Such a method generally comprises steps of simulating, over a period comprising a plurality of instances of time, a displacement or vibration of the silo, a weight of granular material in the silo, and a flow rate of granular material discharged from the silo; calculating, at each instance of time, a resultant dynamic force from the simulated displacement, weight and flow rate; and calculating a resultant dynamic damping force required to maintain vibration amplitudes in the silo below a user-selectable threshold. As above, the formula described herein is used to facilitate this method of simulation.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Accordingly, one example may exemplify certain aspects of the invention, whilst other aspects are exemplified in a different example. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A material silo comprising:
   a silo structure for operatively receiving and/or discharging particulate material;
   a sensor arrangement configured for operatively sensing, over a period comprising a plurality of instances of time, due to material movement via the silo, a displacement of the silo structure, a weight of granular material in the silo, and a flow rate of granular material received and/or discharged from the silo;
   a processor arranged in signal communication with the sensor arrangement, and configured to calculate, at each instance of time, a resultant dynamic force from the sensed displacement, weight and flow rate; and
   a damping arrangement operatively responsive to the processor and configured to dynamically dampen the resultant dynamic force in order to maintain vibration amplitudes in the silo structure below a user-selectable threshold.

2. The material silo of claim 1, wherein the processor is configured to calculate the resultant dynamic force, at each instance of time (t), according to:

$$\Sigma f(t) = (m(t) - dm)\ddot{x}(t) + (2\delta(t)\sqrt{k(t)(m(t) - dm)})\dot{x}(t) + k(t)x(t)$$

where, for the silo:
   x(t) is the displacement at instance of time t;
   $\dot{x}$(t) is the velocity at instance of time t;
   $\ddot{x}$(t) is the acceleration at instance of time t;
   m(t) is the time-variant mass at instance of time t;
   dm is the change in the mass at instance of time t;
   δ(t) is the critical damping ratio at instance of time t;
   k(t) is the stiffness at instance of time t; and
   Σf(t) is the resultant dynamic force at instance of time t.

3. The material silo of claim 1, wherein the sensor arrangement comprises sensors selected from a group consisting of accelerometers, vibrometers, displacement sensors, load cells, strain gauges, weight scales, microphones and flow meters.

4. The material silo of claim 1, wherein the sensor arrangement is configured to capture a vibration, a displacement, a weight of the granular material, and a flow rate at each instance of time and/or incremental change in the time-variant mass of the granular material.

5. The material silo of claim 1, wherein the processor includes a memory arrangement with a database for storing a suitable set of instructions, including user-definable silo characteristics.

6. The material silo of claim 5, wherein the user-definable silo characteristics are selected from a group comprising the critical damping of the silo, the stiffness of the silo structure, a geometry of the silo, structural material properties of the silo, structural member properties comprising the silo, static and/or dynamic load forces of the silo structure, vibration damper properties and locations on the silo structure, silo support properties, and/or any data necessary to enable accurate dynamic analysis of the silo structure.

7. The material silo of claim 1, wherein the damping arrangement comprises at least one damper selected from a group consisting of an active mass damper, an active stiffness damper, a semi-active mass damper, a semi-active stiffness damper, a passive mass damper, a passive stiffness damper, and structural strengthening means.

8. A dynamic vibration attenuation system for a granular material silo operatively receiving and/or discharging particulate material, said system comprising:
   a sensor arrangement configured for operatively sensing, over a period comprising a plurality of instances of time, due to material movement via the silo, a displacement of the silo structure, a weight of granular material in the silo, and a flow rate of granular material received and/or discharged from the silo;
   a processor arranged in signal communication with the sensor arrangement, and configured to calculate, at each instance of time, a resultant dynamic force from the sensed displacement, weight and flow rate; and
   a damping arrangement operatively responsive to the processor and configured to dynamically dampen the resultant dynamic force in order to maintain vibration amplitudes in the silo below a user-selectable threshold.

9. The silo attenuation system of claim 8, wherein the processor is configured to calculate the resultant dynamic force, at each instance of time (t), according to:

$$\Sigma f(t) = (m(t) - dm)\ddot{x}(t) + 2\delta(t)\sqrt{k(t)(m(t) - dm)}\dot{x}(t) + k(t)x(t)$$

where, for the silo:
   x(t) is the displacement at instance of time t;
   $\dot{x}$(t) is the velocity at instance of time t;
   $\ddot{x}$(t) is the acceleration at instance of time t;
   m(t) is the time-varying mass at instance of time t;
   dm is the change in the mass at instance of time t;
   δ(t) is the critical damping ratio at instance of time t;
   k(t) is the stiffness at instance of time t; and
   Σf(t) is the resultant dynamic force at instance of time t.

10. The silo attenuation system of claim 9, wherein the processor is configured to calculate a dynamic response of the silo, at each instance of time (t), with the calculated dynamic force and mass of granular material remaining inside the silo obtained in accordance with the formula of claim 9.

11. The silo attenuation system of claim 8, wherein the sensor arrangement comprises sensors selected from a group consisting of accelerometers, vibrometers, displacement sensors, load cells, strain gauges, weight scales, microphones and flow meters.

12. The silo attenuation system of claim 8, wherein the sensor arrangement is configured to capture a displacement, a vibration, a weight of the granular material, and a flow rate at each instance of time and/or incremental change in mass of the granular material during discharge.

13. The silo attenuation system of claim 8, wherein the processor includes a memory arrangement with a database for storing a suitable set of instructions, including user-definable silo characteristics.

14. The silo attenuation system of claim 13, wherein the user-definable silo characteristics are selected from a group comprising the critical damping of the silo, the stiffness of the silo structure, a geometry of the silo, structural material properties of the silo, structural member properties comprising the silo, static and/or dynamic load forces of the silo structure, vibration damper properties and locations on the silo structure, silo support properties, and/or any data necessary to enable accurate dynamic analysis of the silo structure.

15. The silo attenuation system of claim 8, wherein the damping arrangement comprises at least one damper selected from a group consisting of an active mass damper, an active stiffness damper, a semi-active mass damper, a semi-active stiffness damper, a passive mass damper, a passive stiffness damper, and structural strengthening means.

16. A method for dynamically attenuating silo vibration, said method comprising the steps of:
sensing, over a period comprising a plurality of instances of time, a displacement of the silo, a weight of granular material in the silo, and a flow rate of granular material discharged from the silo;
calculating, at each instance of time, a resultant dynamic force from the sensed displacement, weight and flow rate; and
dynamically damping the resultant dynamic force in order to maintain vibration amplitudes in the silo below a user-selectable threshold.

17. The method of claim 16, wherein the step of calculating is performed by a processor configured to calculate the resultant dynamic force, at each instance of time (t), according to:

$$\Sigma f(t)=(m(t)-dm)\ddot{x}(t)+(2\delta(t)\sqrt{k(t)(m(t)-dm)})\dot{x}(t)+k(t)x(t)$$

where, for the silo:
x(t) is the displacement at instance of time t;
$\dot{x}$(t) is the velocity at instance of time t;
$\ddot{x}$(t) is the acceleration at instance of time t;
m(t) is the mass at instance of time t;
dm is the change in the mass at instance of time t;
δ(t) is the critical damping ratio at instance of time t;
k(t) is the stiffness at instance of time t; and
Σf(t) is the resultant dynamic force at instance of time t.

18. The method of claim 16, wherein the step of sensing is performed by a sensor arrangement comprising sensors selected from a group consisting of accelerometers, vibrometers, displacement sensors, load cells, strain gauges, weight scales, microphones and flow meters.

19. The method of claim 17, wherein the step of calculating comprises calculating, at each instance of time, a dynamic response of the silo structure, at each instance of time (t), with the calculated dynamic force and mass of granular material remaining inside the silo obtained from the formula of claim 17.

20. The method of claim 16, wherein the step of damping is performed by a damping arrangement comprising at least one damper selected from a group consisting of an active mass damper, an active stiffness damper, a semi-active mass damper, a semi-active stiffness damper, a passive mass damper, a passive stiffness damper, and structural strengthening means.

21. A computer programme product which, when executed by a suitable processor, facilitates performance of the method of any one of claims 16 to 20.

22. A computer programme product which, when executed by a suitable processor, facilitates performance of a method of modelling silo vibration, said method comprising the steps of:
simulating, over a period comprising a plurality of instances of time, due to material flow through a silo, a displacement of the silo, a weight of granular material in the silo, and a flow rate of granular material discharged from the silo;
calculating, at each instance of time, a resultant dynamic force from the simulated displacement, weight and flow rate; and
calculating resultant dynamic damping forces required for dynamically maintaining vibration amplitudes in the silo below a user-selectable threshold.

23. The computer programme product of claim 22, wherein the steps of calculating are performed by the processor configured to calculate the resultant dynamic force and/or resultant dynamic damping force, at each instance of time (t), according to:

$$\Sigma f(t)=(m(t)-dm)\ddot{x}(t)+(2\delta(t)\sqrt{k(t)(m(t)-dm)})\dot{x}(t)+k(t)x(t)$$

where, for the silo:
x(t) is the displacement at instance of time t;
$\dot{x}$(t) is the velocity at instance of time t;
$\ddot{x}$(t) is the acceleration at instance of time t;
m(t) is the mass at instance of time t;
dm is the change in the mass at instance of time t;
δ(t) is the critical damping ratio at instance of time t;
k(t) is the stiffness at instance of time t; and
Σf(t) is the resultant dynamic force at instance of time t.

* * * * *